(12) United States Patent
Wu

(10) Patent No.: US 12,312,076 B2
(45) Date of Patent: May 27, 2025

(54) ELECTRIC VERTICAL TAKE-OFF AND LANDING AIRCRAFT

(71) Applicant: Tianfeng Wu, Jiangsu (CN)

(72) Inventor: Tianfeng Wu, Jiangsu (CN)

(73) Assignee: Changzhou Taifei Electric Co., Ltd., Changzhou (CN)

( * ) Notice: Subject to any disclaimer, the term of this patent is extended or adjusted under 35 U.S.C. 154(b) by 0 days.

(21) Appl. No.: 18/052,581

(22) Filed: Nov. 4, 2022

(65) Prior Publication Data

US 2025/0026472 A1   Jan. 23, 2025

(51) Int. Cl.
  *B64C 29/00*  (2006.01)
  *B64C 3/56*  (2006.01)
  *B64C 25/04*  (2006.01)
  *B64D 27/32*  (2024.01)

(52) U.S. Cl.
  CPC ............ *B64C 29/0075* (2013.01); *B64C 3/56* (2013.01); *B64C 25/04* (2013.01); *B64D 27/32* (2024.01)

(58) Field of Classification Search
  CPC ....... B64C 29/0075; B64C 3/56; B64C 25/04; B64D 27/32; B64U 20/50; B64U 50/14
  See application file for complete search history.

(56) References Cited

U.S. PATENT DOCUMENTS

| | | | | |
|---|---|---|---|---|
| 2,346,010 A | * | 4/1944 | Cowey | B64C 25/04 244/102 R |
| 7,147,182 B1 | * | 12/2006 | Flanigan | B64C 29/0033 244/6 |
| 2019/0291860 A1 | * | 9/2019 | Morgan | B64C 21/00 |
| 2023/0067713 A1 | * | 3/2023 | Burns | B64C 3/56 |
| 2024/0308644 A1 | * | 9/2024 | Furlinger | B64C 3/56 |

FOREIGN PATENT DOCUMENTS

CN    114104280 A  *  3/2022

OTHER PUBLICATIONS

Merged machine translation of reference Wu (CN Pub No. 114104280 A) Pub date Mar. 1, 2022 (Year: 2022).*

* cited by examiner

*Primary Examiner* — Rodney A Bonnette

(57) ABSTRACT

An electric aircraft is capable of vertically taking off and landing. The aircraft includes a fuselage, front and rear power units, power pods, main wings, ailerons, front landing gears, a tail wing and a rear landing gear. The power units include first and second electric duct groups. The first electric duct group includes two electric duct fans symmetrically and connected to two sides of a front portion of the fuselage respectively. The second electric duct group includes two electric duct fans symmetrically provided at two sides of a rear portion of the fuselage respectively. The power pods are configured to connect the fuselage to the first electric duct group. The two main wings are symmetrically and foldably connected to two sides of the fuselage respectively. The two ailerons are symmetrically connected to front ends of the two main wings respectively.

7 Claims, 6 Drawing Sheets

ELECTRIC VERTICAL TAKE-OFF AND LANDING AIRCRAFT

FIELD OF THE INVENTION

The invention relates to aviation, and more particularly relates to an electric vertical take-off and landing aircraft.

BACKGROUND OF THE INVENTION

Economic development and scientific and technological progress have boosted automobile civilization to reach its peak. Meanwhile, the development has also caused a series of traffic problems. Rapid development of human civilization and irrational use of resources have led to climate warming that is the reason of sea level rise. Thus, a concept of a new city has been put forward. It provides an opportunity and power for design and development of an urban aircraft. The urban aircraft development will become another major change in the history of human travel mode.

Most of existing aircrafts are unsuitable for flying in an urban environment due to a complex terrain and a dense population of a city. Therefore, an electric vertical take-off and landing aircraft is provided to solve the above problems.

SUMMARY OF THE INVENTION

An objective of the invention is to provide an electric vertical take-off and landing aircraft so as to adapt to urban environmental problems.

The invention achieves the above objective through the technical solution as follows: an electric vertical take-off and landing aircraft includes a fuselage, power units, power pods, main wings, ailerons and a tail wing, where the power units include a first electric duct group and a second electric duct group, the first electric duct group includes two electric duct fans, the two electric duct fans are symmetrically and fixedly connected to two sides of a front portion of the fuselage, the second electric duct group includes two electric duct fans, the two electric duct fans are symmetrically provided at two sides of a rear portion of the fuselage, the power pods are configured to connect the fuselage and the first electric duct group, the two main wings are of forward-swept structures, the two main wings are symmetrically and foldably connected to two sides of the fuselage by means of hinges, the main wings keep a certain safe distance from the ground after being folded down, and the two ailerons are symmetrically connected to front ends of the two main wings by means of hinges respectively.

Preferably, the two main wings are of forward-swept structures having upper single wings capable of being folded down.

Preferably, the two ailerons are symmetrically connected to the front ends of the main wings respectively.

Preferably, the tail wing is perpendicular to a longitudinal direction of the fuselage, and is connected to the rear portion of the fuselage by means of a hinge device.

Preferably, a front end of the fuselage is provided with a passenger cabin.

Preferably, a left side of the fuselage is provided with a cabin door.

Preferably, a bottom of a front end of the fuselage is symmetrically provided with two front landing gears.

Preferably, a lower portion of the tail wing is provided with a rear landing gear.

The aircraft is a prototype that conforms to a function and an aerodynamic shape. In a later detailed design stage, within a scope of an aerodynamic layout of the aircraft, an appearance size, a function and a motion law of each component may be modified and changed. A cross section of a part of the fuselage of the aircraft connected to the main wings has the same shape as a wing section of the main wings. Due to a flying requirement in an urban environment, the aircraft uses a shape having a high lift-drag ratio, and the fuselage, wings, the ailerons and the tail wing of the aircraft are made of carbon-fiber-based materials. All driving motor seats, all stressed rods of a connecting rod mechanism, landing gear rods, etc. are made of aviation light alloys. Various necessary components are provided in the fuselage, and a mounting height and a mounting position of each component are associated with a stress state during flight, such that flight is reliable and stable, and the aircraft is convenient to operate.

The invention has the following beneficial effects:

1. Using forward-swept main wings has the following advantages:

Structural advantages: a forward-swept wing structure may ensure better connection between the wings and the fuselage, and may make the aircraft have desirable aerodynamic performance during a low-speed flight, such that maneuverability at an elevation angle is greatly improved, and a flight speed is increased.

2. Using the main wings capable of being folded down has the following advantages:

Structural advantages: the main wings may stretch out and draw back in any one of a plurality of landing modes according to a surrounding take-off and landing environment, such that a width of the aircraft landing on the ground is greatly decreased, landing requirements of more places are flexibly met, and higher passive safety is brought.

Aerodynamic advantages: after being folded down, the main wings of two sides form a semi-closed structure with a middle cabin and the ailerons folded inwards, such that when the first electric duct group ejects a high-speed airflow, a high-speed downwash airflow is wrapped to form a high-pressure air cushion that assist the aircraft in taking off and landing efficiently, and because the aircraft is safer, more efficient, compact, and less noisy, it is especially suitable for complex urban environments.

3. Providing the front ailerons has the following advantages: when the aircraft takes off, the ailerons are folded inwards to the fuselage, that is, the ailerons are folded towards the fuselage, and a high-speed airflow flows to the fuselage, so as to assist the aircraft in taking off; and during a fixed-wing cruise, the ailerons are configured to control a pitching motion and yawing of the aircraft, and because the ailerons are far from a center of gravity of the fuselage, a flight attitude may be controlled more favorably.

The above and other objects, features and advantages of the invention will become apparent from the following detailed description taken with the accompanying drawings

DETAILED DESCRIPTION OF THE INVENTION

Figure 1:
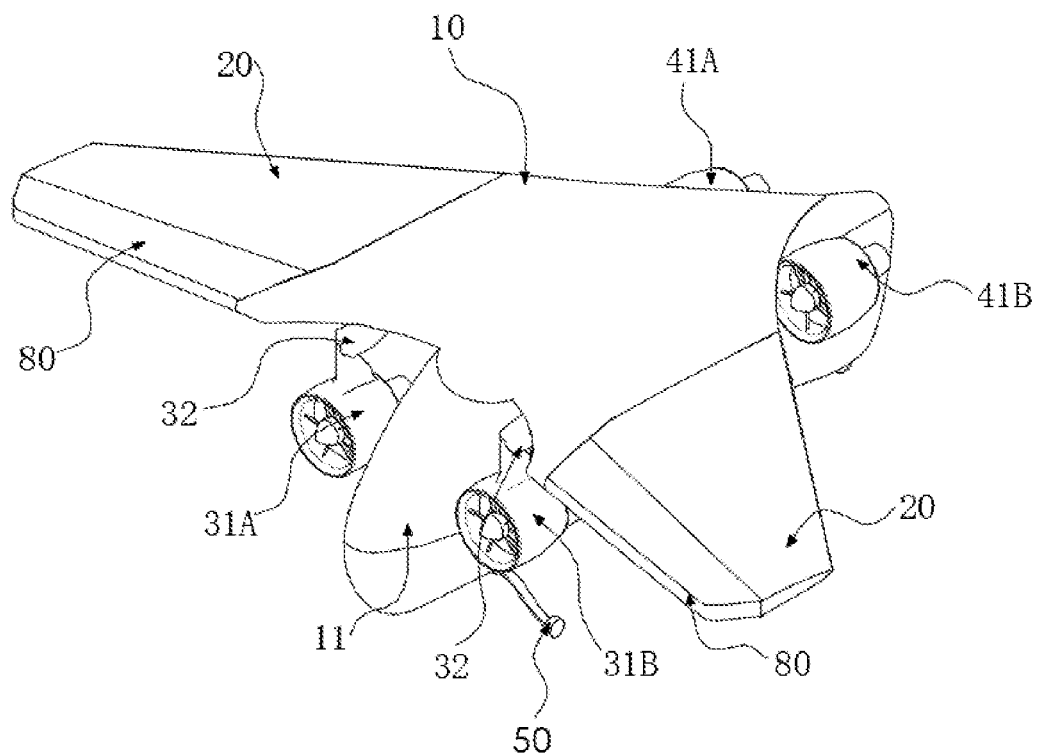
FIG. 1 is a perspective view of an electric aircraft of the invention.

In order to make objectives, features and advantages of the invention more obvious and easier to understand, a technical solution in embodiments of the invention will be clearly and completely described below with reference to the accompanying drawings in the embodiments of the invention. Apparently, the embodiments described are merely some rather than all of the embodiments of the invention. All other embodiments obtained by those of ordinary skill in the art on the basis of the embodiments of the invention without creative efforts shall fall within the protection scope of the invention.

The technical solution of the invention is further described below in conjunction with the accompanying drawings and through specific implementations.

In the description of the invention, it should be understood that orientations or positional relationships indicated by the terms "upper", "lower", "top", "bottom", "inside", "outside", etc. are based on the orientations or positional relationships shown in the accompanying drawings and are merely for facilitating the description of the invention and simplifying the description, rather than indicating or implying that a device or an element referred to must have a particular orientation or be constructed and operated in a particular orientation, and thus will not be interpreted as limiting the invention.

With reference to FIGS. 1-11, an electric aircraft of the invention comprises a fuselage 10, power units, power pods 32, main wings 20, ailerons 80 and a tail wing 60, where the power units include a first electric duct group 31 and a second electric duct group 41, the first electric duct group 31 includes two electric duct fans 31A, 31B, the two electric duct fans 31A, 31B are symmetrically and fixedly connected to two sides of a front portion of the fuselage 10, the second electric duct group 41 includes two electric duct fans 41A, 41B, the two electric duct fans 41A, 41B are symmetrically provided at two sides of a rear portion of the fuselage 10, each electric duct fan is composed of one or more groups of main motors, the electric duct fans are driven and rotated by the main motors to generate power, and are connected to the front and rear portions of the fuselage 10 by means of hinges, and under the control of a flight controller, a control motor drives a control device to rotate around the hinge by a certain angle. Electric motors are divided into main motors, some control motors and other auxiliary motors. The power units of the aircraft mainly use the electric duct fans capable of tilting, and the tilting refers to a function that a duct power unit may rotate around a fixed fulcrum by a certain angle, such that lift and thrust required by a scene may be generated, or under the condition that both the lift and thrust exist, vertical take-off, landing and cruising may be achieved. The electric duct fans are internally provided with the main motors, fixed-pitch propellers (which are fans), duct fairings and other necessary components. The fans are divided into leftward-rotated fans and rightward-rotated fans, which are symmetrically mounted on the fuselage 10, such that force balance of the aircraft is achieved.

The power pods 32 are configured to connect the fuselage 10 and the first electric duct group 31, and the power pods 32 are internally provided with control motors and tilting mechanisms. The power pods are mainly configured to connect the fuselage 10 and duct groups. The control motors control the tilting mechanisms so as to make a first electric duct tilt by a certain angle around a rotation center of hinges of the pods. The two main wings 20 are of forward-swept structures, the two main wings 20 are symmetrically and foldably connected to two sides of the fuselage 10 by means of hinges, the main wings 20 keep a certain safe distance from the ground after being folded down, under the control of a flight controller, the main wings may be driven by the electric motors to stretch out and draw back around the hinges, in a ground shutdown state, the two main wings 20 are parallel to a longitudinal horizontal line of the fuselage 10, the two ailerons 80 are symmetrically connected to front ends of the two main wings 20 by means of hinges, and under the control of the flight controller, the control motors may drive the ailerons to rotate around the hinges by a certain angle.

Figure 2:
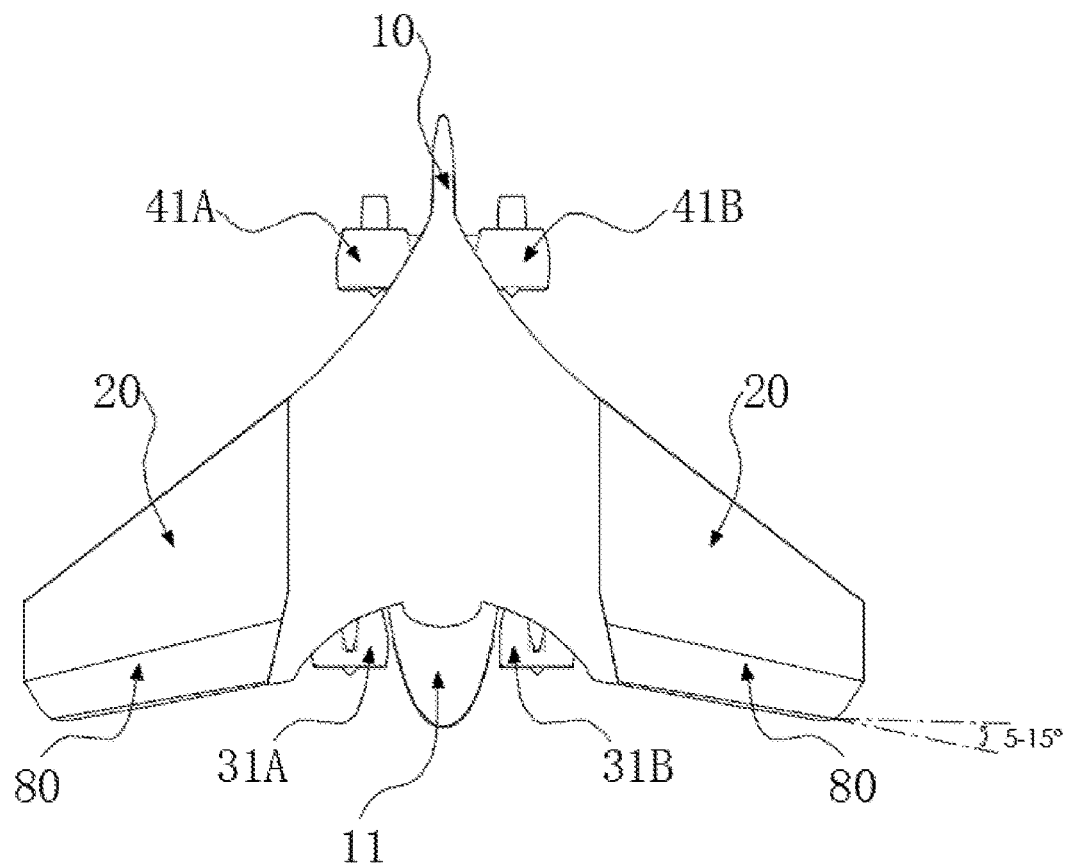
FIG. 2 is a top view of the aircraft during a fixed-wing cruise.
Figure 3:
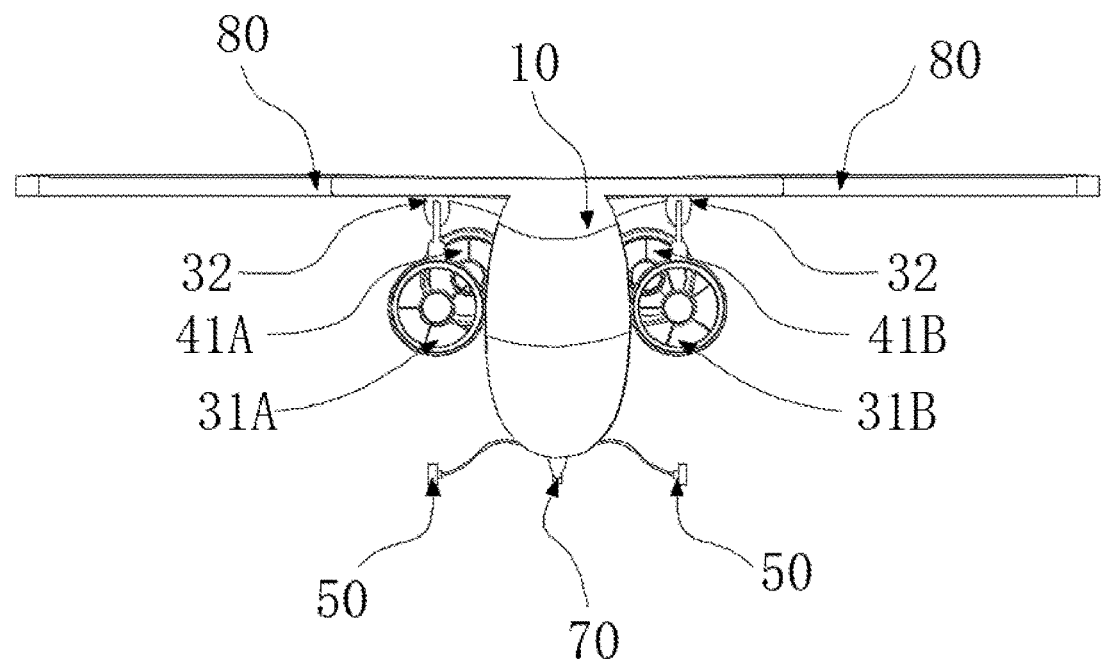
FIG. 3 is a front view of the aircraft during a fixed-wing cruise.
Figure 4:
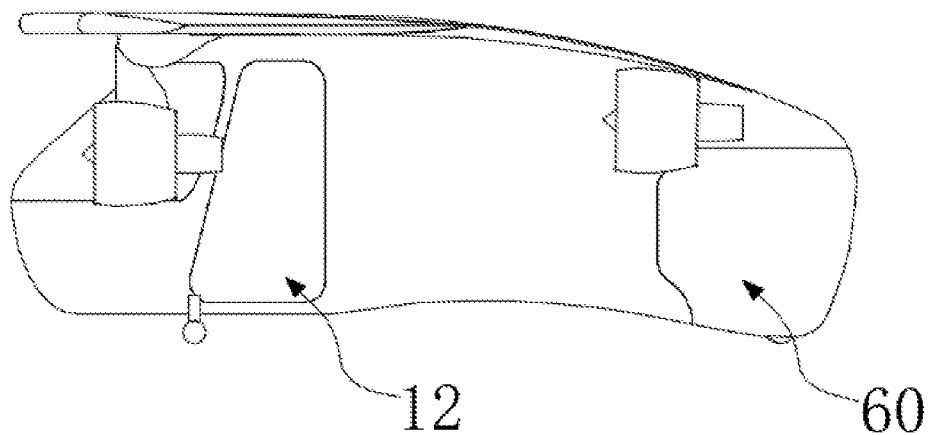
FIG. 4 is a left view of the aircraft with wings opened.

The two main wings 20 are of forward-swept structures having upper single wings capable of being folded down, such that a width of the aircraft landing on the ground is greatly decreased, landing requirements of more places are flexibly met, and higher passive safety is brought. In addition, after being folded down, the main wings 20 of two sides form a semi-closed structure with a middle cabin and the ailerons 80 folded inwards, such that when the first electric duct group 31 ejects a high-speed airflow, a high-speed downwash airflow is wrapped to form a high-pressure air cushion that assist the aircraft in taking off and landing efficiently. The two ailerons 80 are symmetrically connected to the front ends of the main wings 20 respectively, and have included angles with a wingspan is 5 degrees-15 degrees (as shown in FIG. 2). On the one hand, when the aircraft takes off, the ailerons are folded inwards to the fuselage 10, that is, the ailerons are folded towards the fuselage 10, and a high-speed airflow flows to the fuselage 10, so as to assist the aircraft in taking off; and on the other hand, during a fixed-wing cruise, the ailerons 80 are configured to control a pitching motion and yawing of the aircraft. The tail wing 60 is connected to the rear portion of the fuselage 10 by means of a hinge device, and the tail wing 60 is a perpendicular tail wing. A front end of the fuselage 10 is provided with a passenger cabin 11, so as to facilitate use. A left side of the fuselage 10 is provided with a cabin door 12, and the cabin door 12 in an open state, the main wings 20 in a folded state and the electric duct fan in a tilting state cannot collide. A bottom of a front end of the fuselage 10 is symmetrically provided with two front landing gears 50, so as to facilitate take-off and landing. A lower portion of the tail wing 60 is provided with a rear landing gear 70, so as to facilitate take-off and landing. The aircraft is internally provided with one or more groups of independently distributed lithium batteries, and the lithium batteries are used as an energy source of the aircraft. A flight control device of the aircraft includes a plurality of sets of hardware and software, and controls moving components of the aircraft, and operations among the components are coordinated according to a flight scene mode and other programs.

A relative position of the first electric duct group 31 of the aircraft has specific requirements that the position must be at a symmetrical position of a central axis of the aircraft, and a rotation angle of the first electric duct group 31 relative to a rotation center of the hinge of the pod should be greater than 90 degrees, such that it is ensured that entrance and exit of people and smoothness of an air inlet are not affected, and the first electric duct group is connected to a front upper portion of the fuselage 10 by means of the power pods 32. The power pods 32 are internally provided with the control motors and the tilting mechanisms, and the control motors control the tilting mechanisms so as to make the first electric duct group 31 tilt by a certain angle around a rotation midpoint of the hinges of the pods.

Figure 10:
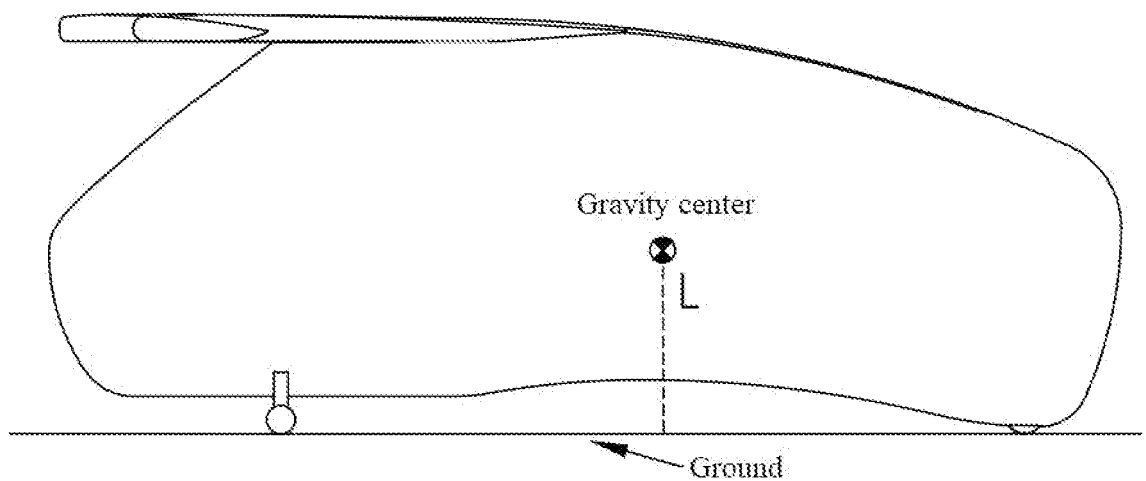
FIGS. 10 and 11 are schematic diagrams of forces born by an aircraft in an ideal state of being parked on the ground respectively.
Figure 11:
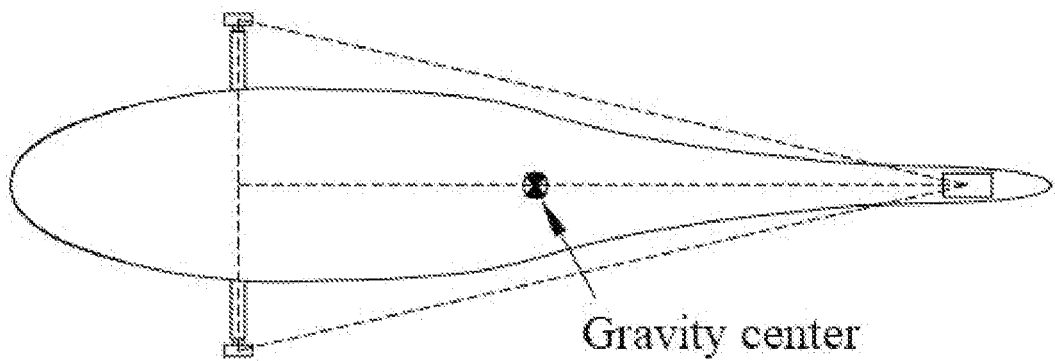

As shown in FIGS. 10 and 11, all control surfaces of the aircraft, including the left and right ailerons 80, should be strictly mounted at symmetrical positions of a centerline of the fuselage 10 of the aircraft. When the aircraft is parked on the ground, the left and right landing gears should have consistent stress directions and similar stress levels, and are symmetrical with respect to the central axis of the fuselage 10.

Figure 7:
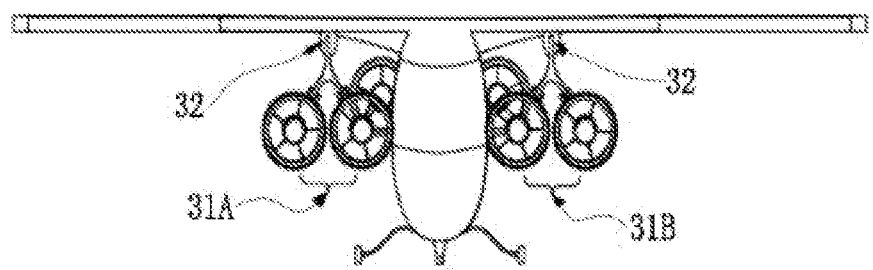
FIG. 7 is a front view of the aircraft (a first electric duct group is composed of four ducts) during a fixed-wing cruise.
Figure 8:
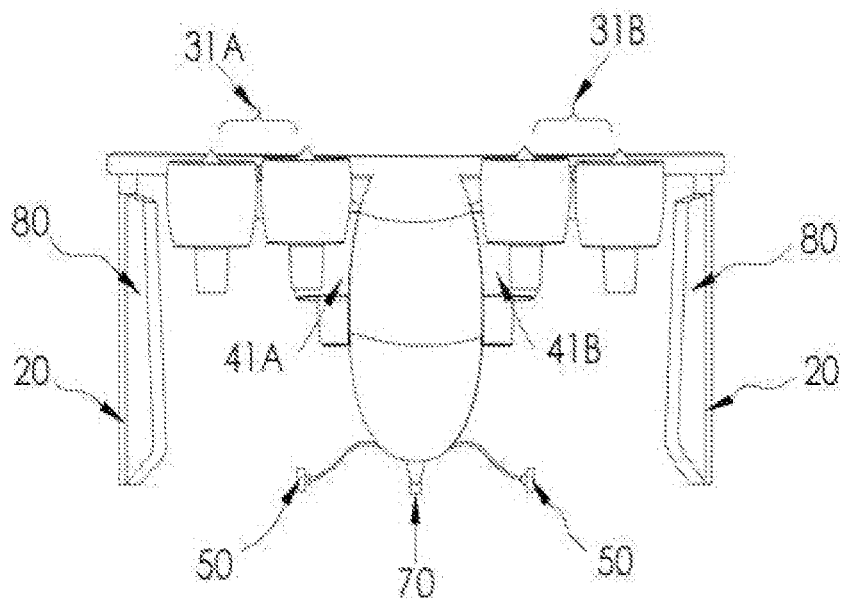
FIG. 8 is a front view of the aircraft (a first electric duct group is composed of four ducts) during take-off.
Figure 9:
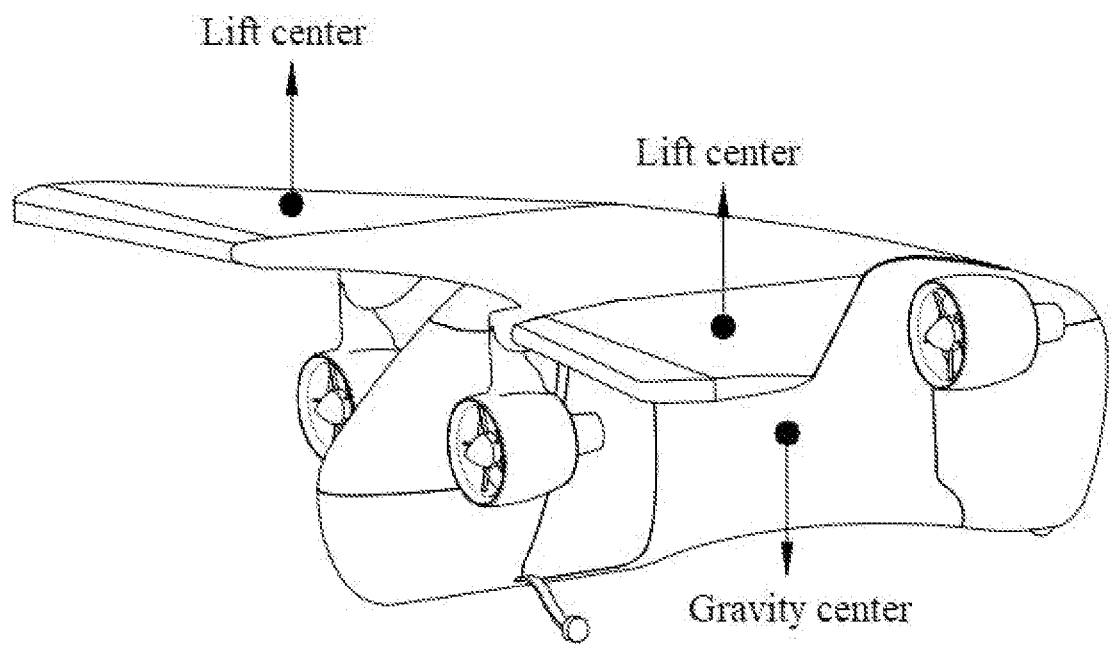
FIG. 9 is a schematic diagram of an unstable aerodynamic layout of an aerodynamic lift center of an aircraft in front of a center of gravity of a fuselage.

Each first electric duct group 31 may include 1, 2, 3 or more electric duct fans, and a fan rotation speed and a duct tilting angle may be separately controlled by the flight controller. With reference to FIG. 7, when each first electric duct group 31A, 31B for driving the aircraft includes 2 electric duct fans, power redundancy may be increased and safety is higher.

Figure 5:
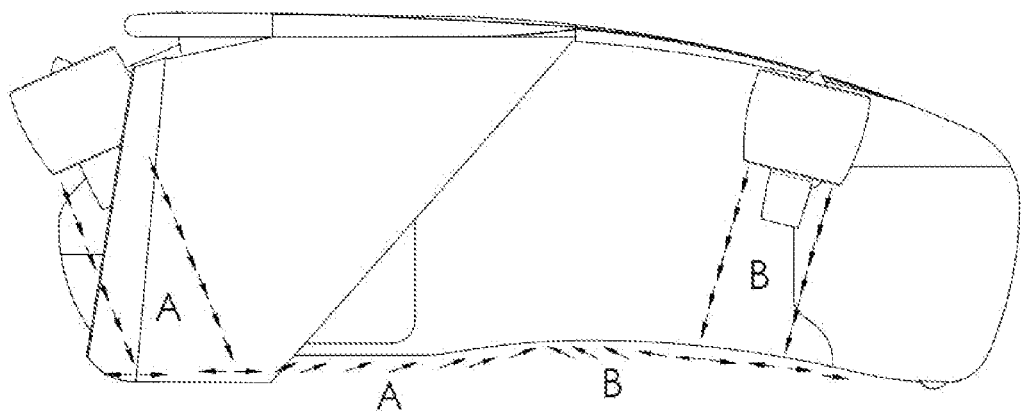
FIG. 5 is a right view of the aircraft during take-off.
Figure 6:
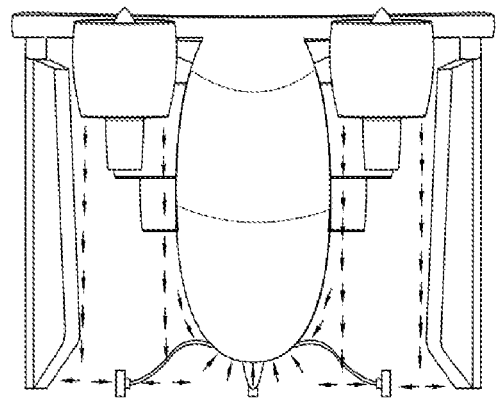
FIG. 6 is a front view of the aircraft during take-off.

With reference to FIGS. 5 and 6, when the aircraft is parked on the ground, the main wings 20 are folded down, the landing gears 50 make contact with the ground, the main wings 20 have a certain safe distance from the ground, the tail wing 60 is vertically connected to the rear portion of the fuselage 10 by means of a hinge, and the rear landing gear 70 is connected to the lower portion of the tail wing 60; and the two ailerons 80 are folded and connected to the front ends of the main wings 20.

Before take-off, it is necessary to ensure that meteorological conditions are desirable, surrounding areas are in good condition, all components of the aircraft are normal, a parking space of the aircraft must be relatively wide and flat, and the aircraft has a good appearance. With a specific flight as an example, illustration is as follows:

When the aircraft takes off or lands, airflow directions of air outlets of the electric duct fans are consistent. When the aircraft takes off, airflows gradually increase, and when the aircraft lands, the airflows gradually decrease. The two main wings 20 are folded down, and the ailerons 80 turn inwards to the fuselage 10, so as to form an airflow channel. An air outlet direction of the first electric duct group 31 tilts towards the rear portion of the fuselage 10, and has an included angle with a gravity direction of the fuselage 10 being greater than or equal to 5 degrees and smaller than or equal to 15 degrees, and a direction of an airflow driven by the first electric duct group is shown as A in FIG. 4. A second air outlet direction of the second electric duct group 41 tilt towards the front portion of the fuselage 10, and has an included angle with the gravity direction of the fuselage 10 being greater than or equal to 5 degrees and smaller than or equal to 15 degrees, and a direction of an airflow driven by the second electric duct group is shown as B in FIG. 4. When the aircraft takes off, a plurality of electric duct fans simultaneously blow out air downwards, a front downwash flow forms a semi-enclosed state with the main wings 20 folded down of two sides of the fuselage 10, so as to form a semi-closed state of the wings folded down, the fuselage 10 and the ground, the front and rear electric duct fans eject high-speed downwash airflows downwards, and then the airflow is reflected upward by the ground so as to form a fountain effect. The effect acts on a lower surface of the fuselage 10 so as to form a counter-acting force, and a ground effect makes the high-speed airflow generate a high-pressure air cushion between the fuselage 10 and the ground, such that a counter-acting force is generated, the high-speed airflow is fully used to do work, motor power of the electric duct fans may be reduced, and vertical take-off may be easier to achieve.

When the aircraft is vertical lifted to reach a certain height, the main wings 20 of two sides open up and stretch out, and all the electric duct fans tilt by a certain angle according to actual requirements, such that the aircraft moves in a specified direction. In the process, when a speed of the aircraft increases to a point where the main wings 20 generate enough lift, power output of the electric duct fans may be reduced, and the electric duct fans output air backwards to generate thrust, such that the aircraft may enter a fixed-wing cruise state. In this case, motor control mechanisms are driven to make the main wings 20 stretch out to two sides completely, the ailerons 80 stretch out forward completely, the tail wing 60 is in the same direction as a forward direction, and air outlet directions of all the electric duct fans are backward. When the aircraft reaches a certain safe height and a speed is enough to make the stretched main wings 20 generate lift to overcome their own weights, the aircraft may enter a cruise state. When the aircraft needs to pitch to achieve a flight height, the flight control device transmits an instruction to control motor driving mechanisms of the ailerons 80 to make the ailerons 80 rotate around the hinges by a certain angle. When the aircraft flies upwards, the ailerons 80 are controlled to turn upwards by a certain angle, and when the aircraft flies downwards, the ailerons are controlled to turn downwards by a certain angle. In many special cases, pitching may also be completed by making the electric duct fans tilt and adjusting speeds of the electric duct fans. When yawing is required, under the control of the flight control device, the ailerons 80 are driven by the electric motors to rotate upwards and downwards by a certain angle around the hinges, and the tail wing 60 also makes an associated action of rotating by a certain angle around the hinge according to a program, such that a required steering torque is generated. When the aircraft needs to yaw leftwards, a combined action of controlling a left aileron to move downwards, a right aileron to move upwards and the tail wing 60 to move leftwards is conducted; and similarly, when the aircraft needs to yaw rightwards, the flight control device transmits a reverse operation instruction so as to achieve a rightward yawing action, which is a preferred operation mode in a fixed-wing cruise state. Secondly, yawing may be completed by changing angles and rotation speeds of the electric duct fans, and a flight trace may be controlled through automatic fine adjustment. In some special cases, after taking off, the aircraft may take off and land in a multi-rotor flight mode without making the main wings 20 stretch out, that is, in a tilting duct transition state, but the mode may greatly increase power loss of the aircraft.

In a flight process of this aircraft, an automatic flight control device executes and operates controllable components. The flight control device of the aircraft has a plurality of sets of hardware and software as backup. The electric duct fans, driving connecting rod mechanisms and the tilting mechanisms of the aircraft are all controlled by the flight control device. According to an instruction of the flight control device, the required lift and thrust are generated, and the whole process is linked, continuous, stoppable and reversible. In addition, all the electric motors of the aircraft may be linked under the instructions of the flight control device, thereby controlling attitudes and actions of the aircraft. Moreover, the flight control device is further connected to various sensors, other auxiliary devices (such as a global positioning system (GPS)), communicators, etc., which may receive and feedback various information so as to ensure a more stable and reliable flight of the aircraft.

When the aircraft is about to land, the flight control device may control power output of the electric duct fans so as to reduce the rotation speed, and meanwhile, the flight control device may control electric motors of the duct tilting mechanisms to act to make the air outlet directions of the ducts tilt around the hinges to reach an appropriate angle. When the aircraft decelerates to an appropriate speed and is lowered to a certain height, all the electric duct fans tilt downwards to generate lift, so as to together solve a problem of insufficient lift of the main wings 20. When the aircraft is lowered to a small distance from the ground, the flight control device drives the control motors to make the main wings 20 be folded down, and the front landing gears and the rear landing gear 70 of the fuselage 10 together form a rear three-point-supported aircraft. When moving slowly on the paved ground, the aircraft is driven by wheels of the rear landing gear.

There are many landing modes of the aircraft: (1) The main wings 20 are folded for vertical landing, when the aircraft is about to land, the aircraft needs to decelerate to an appropriate speed and be lowered to a certain height, the first electric duct group 31 tilts to generate a proper amount of downward lift, and meanwhile, the second electric duct group 41 tilts slowly from a horizontal backward air-outlet state to generate downward lift while, which makes up for the lift of the main wings 20 together with the first electric duct group 31. When the aircraft is lowered to a small distance from the ground, the main wings 20 are folded down, and the front landing gears and the rear landing gear 70 of the fuselage 10 together form a rear three-point-supported aircraft. (2) Landing in a fixed-wing mode is similar to a traditional fixed-wing aircraft mode, when the aircraft lands at a certain distance from the ground, the main wings 20 are in an open state, air outlets of the first electric duct group 31 and the second electric duct group 41 are all backward, the duct groups stop so as to achieve a deceleration effect, and meanwhile, through cooperation of the landing gears, the aircraft may land on a paved road in a running mode. (3) The main wings 20 are opened for vertical landing, the mode is similar to the landing mode (1), and there is only a difference in that the main wings 20 are folded or not.

The aircraft is based on a safest fixed-wing aircraft type, and is matched with efficient and compact electric duct fans. The electric duct fans are mounted at the front and rear portions of the fuselage 10. Because the electric duct fans are mounted at different positions in the fuselage, the electric duct fans are driven by different mechanisms to ensure reliability and compactness, and energy saving and vibration reduction are considered. Moreover, the electric duct fans are tilting parts, mounting heights should be considered in a parked state, people are prevented from hurting as much as possible, and the electric duct fans in a tilting state cannot collide with the main wings 20 and the ailerons 80 in all states.

The aircraft belongs to a vertical take-off and landing type in function, and is a multifunctional aircraft. At present, the aircraft is initially designed as a single-person aircraft, but later developed as a multi-person aircraft, which may fly in an airspace having an altitude of 3000 meters or below. In many cases, the aircraft may be driven and controlled by passengers. In some cases, the aircraft may fly autonomously without the control of passengers. There are many flight states including a fixed-wing cruise state, a fixed-wing take-off and landing state, a tilting duct take-off and landing state and a tilting duct transition state. In a cruise state, an electric duct fan group may be actively turned off under the control of the flight control device, and the aircraft may increase flight resistance, thus achieving a deceleration effect. At a set cruise speed, the aircraft has at least one main wing 20 to provide the required lift, that is, one main wing 20 may provide the required lift of the entire aircraft.

The power of the aircraft comes from the electric duct fans, and the lift comes from the main wings 20 stretching out. The energy comes from one or more internal lithium battery packs, and the lithium battery packs further include temperature managers, energy distributors, current controllers and other components. The electric duct fans are provided on the fuselage 10 in an inverted triangle mode, a plurality of electric duct fans are fixed on the front end of the fuselage 10, and rear ends thereof are mounted on a rotary supporting shaft. The maximum thrust of a single electric duct fan is greater than 35% of the maximum weight of the aircraft, and the applicable thrust of a single electric duct fan is not greater than 85% of the maximum thrust generated by rated power. In a certain cases, the aircraft may leave the ground and rise to a certain height merely by using all the electric duct fans. According to requirements of different working conditions, the electric duct fans may tilt or the rotation speed of the electric duct fans may be changed, such that the required control torque may be generated and the flight attitude of the aircraft may be changed.

Explanation: An aircraft having a higher density than air may keep a stable longitudinal flight only by making a controllable torque to overcome a disturbance torque and eliminating resistance and its own gravity to keep the aircraft stable, The main wings 20 generate lift to overcome their own gravity, the electric duct fans generate thrust to overcome air resistance, and the ailerons 80, the tail wing 60 and tilting ducts generate a control torque so as to achieve longitudinal stability of a flight.

The related circuits and electronic components and modules are all in the prior art, which can be completely achieved by those skilled in the field and will not be repeated herein. The content protected by the invention does not involve improvement of software and methods.

While the invention has been described in terms of preferred embodiments, those skilled in the art will recognize that the invention can be practiced with modifications within the spirit and scope of the appended claims.

What is claimed is:

1. An electric vertical take-off and landing aircraft, comprising a fuselage, power pods, main wings, ailerons, a tail wing, and power units including a first electric duct group and a second electric duct group wherein the first electric duct group includes two electric duct fans symmetrically and connected to two sides of a front portion of the fuselage respectively; the second electric duct group includes two electric duct fans symmetrically provided at two sides of a rear portion of the fuselage respectively; the power pods are configured to connect the fuselage to the first electric duct group; the two main wings are of forward-swept structures; the two main wings are hingedly, symmetrically and foldably connected to two sides of the fuselage respectively; the main wings keep a predetermined safe distance from the ground after being folded down; and the two ailerons are hingedly and symmetrically connected to front ends of the two main wings respectively.

2. The electric vertical take-off and landing aircraft of claim 1, wherein the two main wings include upper single wings capable of being folded down.

3. The electric vertical take-off and landing aircraft of claim 1, wherein the tail wing is perpendicular to a longitudinal direction of the fuselage, and is hingedly connected to the rear portion of the fuselage.

4. The electric vertical take-off and landing aircraft of claim 1, wherein a front end of the fuselage is provided with a passenger cabin.

5. The electric vertical take-off and landing aircraft of claim 1, wherein a left side of the fuselage is provided with a cabin door.

6. The electric vertical take-off and landing aircraft of claim 1, wherein a bottom of a front end of the fuselage is symmetrically provided with two front landing gears.

7. The electric vertical take-off and landing aircraft of claim 1, wherein a lower portion of the tail wing is provided with a rear landing gear.

\* \* \* \* \*